April 22, 1952 A. C. NIELSEN 2,593,593

MAILABLE MAGAZINE TYPE RECORDER WITH COIN RELEASE MECHANISM

Filed Oct. 29, 1948 6 Sheets-Sheet 1

INVENTOR.
Arthur C. Nielsen,
BY Mason, Kolehmainen, Rathburn & Wyss Att'ys.

MAILABLE MAGAZINE TYPE RECORDER WITH COIN RELEASE MECHANISM

Filed Oct. 29, 1948

6 Sheets-Sheet 2

INVENTOR.
Arthur C. Nielsen,
BY
Mason, Kolehmainen,
Rathburn & Wyss Att'ys.

MAILABLE MAGAZINE TYPE RECORDER WITH COIN RELEASE MECHANISM

Filed Oct. 29, 1948

INVENTOR.
Arthur C. Nielsen,
BY Mason, Kolehmainen, Rathburn & Wyss Att'ys.

MAILABLE MAGAZINE TYPE RECORDER WITH COIN RELEASE MECHANISM

Filed Oct. 29, 1948

INVENTOR.
Arthur C. Nielsen,
BY Mason, Kolehmainen, Rathburn & Wyss Attys.

April 22, 1952

A. C. NIELSEN 2,593,593

MAILABLE MAGAZINE TYPE RECORDER WITH COIN RELEASE MECHANISM

Filed Oct. 29, 1948

6 Sheets-Sheet 5

INVENTOR.

Arthur C. Nielsen,

BY

Mason, Kolehmainen, Rathburn & Wyss Att'ys.

MAILABLE MAGAZINE TYPE RECORDER WITH COIN RELEASE MECHANISM

INVENTOR.
Arthur C. Nielsen
BY Mason, Kolehmainen, Rathburn & Wyss,
Attys.

Patented Apr. 22, 1952

2,593,593

UNITED STATES PATENT OFFICE 2,593,593

MAILABLE MAGAZINE TYPE RECORDER WITH COIN RELEASE MECHANISM

Arthur C. Nielsen, Winnetka, Ill., assignor to A. C. Nielsen Company, Chicago, Ill., a corporation of Illinois Application October 29, 1948, Serial No. 57,294

4 Claims. (Cl. 312—94)

The present invention relates to coin release or discharge mechanisms and more particularly to coin release mechanisms associated with recording devices employing a mailable record magazine wherein coins, tokens or the like are released when the record magazine is properly inserted into its position in an associated recorder.

In most recording applications it is necessary periodically to gather up the recorded information for purposes of analysis, correlation or the like. Consequently it has been the practice to have personnel for this purpose periodically to gather up the recorded information by removing from the recorder the portion of the recording element upon which a record has been produced and replacing it with a recording element such as a recording tape or the like upon which subsequent recordings can be made. More recently, to simplify the removal and replacement of recording elements, recorders have been provided in which the recording element is mounted within a suitable magazine or the like so that the simple removal of one magazine and the replacement by another magazine is all that is required. Consequently skilled personnel for this purpose are no longer required since the magazines may be unloaded and reloaded at a point remote from the location of the recording apparatus. In some recording applications the recorders are located at widely scattered points such as in widely scattered homes or the like. It is obvious that a substantial saving could be realized if instead of employing field men or other personnel periodically to remove and replace the magazines from recorders disposed in widely scattered locations persons located near the apparatus could be induced to perform this function and mail the removed magazine to a designated place. One specific recording application to which the present invention is especially applicable is in connection with recording the listening habits of wave signal receiver users. One system and apparatus for this purpose is disclosed and claimed in copending Rahmel application, Serial No. 762,962, filed July 23, 1947, and assigned to the same assignee as the present application. In such a system and apparatus, for determining the listening habits of wave signal receiver users, continuous records are produced on movable tapes, or other suitable recording elements, of the tuning conditions of a representative group of wave signal receivers which are widely scattered over a substantial area of the country. These records must be made available to an analysis organization at periodic intervals such as once a week. Consequently they must be gathered up and delivered to the analysis organization. A substantial cost item is involved in the form of salaries, transportation costs and the like of field men to cover the expense of gathering up the recorded information and transmitting it to the analysis organization. By employing mailable magazines such as are disclosed in the copending Rahmel application a substantial saving in cost could be realized if the collaborator in whose home the recording device is located could be induced to replace the magazines periodically and mail the magazines removed from the recorder which contain the information recorded for the preceding time period to the analysis organization, which in turn would keep the collaborator supplied with reloaded magazines in which the recording element or record tape therein has been replenished. It is, of course, essential to a proper statistical analysis by an analysis organization that the magazines be replaced at predetermined intervals and furthermore that within a predetermined time period preferably within a few days after replacement of the new magazine that the record contained in the replaced magazine is made available to the analysis organization. It would be desirable, therefore, to provide some incentive whereby the collaborator is encouraged to replace the magazine containing the exposed recording element with a replenished magazine and mail the former to the analysis organization. The present invention is concerned with an arrangement whereby an incentive is provided to insure the replacement of such magazines in the form of automatically presenting the collaborator with one or more coins or tokens upon proper performance of this simple task allotted to him.

Accordingly it is an object of the present invention to provide a record device employing a mailable recording magazine with means for automatically making available something of value upon insertion of the magazine into the recorder.

It is another object of the present invention to provide an arrangement in connection with recording apparatus employing mailable record magazines for insuring at low cost prompt receipt of the magazines at a central location remotely located with respect to widely scattered recorders.

It is another object of the present invention to provide a coin or token discharge device in a mailable record magazine together with means for automatically discharging one or more coins or tokens in response to the proper association of the magazine with a recorder.

It is a further object of the present invention to provide in connection with a statistical analysis recording apparatus employing mailable magazines for the recording element, means for automatically releasing an item of value in response to the proper association of the magazine with the recorder in a manner so that record indications are produced on the recording tape within the magazine, including an arrangement whereby the value of the item may vary in dependence upon prompt association of the magazine with the recorder.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which:

Fig. 3 shows a complete structure, but with the magazine not quite completely inserted into the recording device, or in other words in a position prior to complete insertion of the magazine into the recording device;

Fig. 12 shows a complete structure, but without the complete insertion of the magazine of Fig. 11 into its position in the recorder;

Fig. 17 shows a complete structure;

It should be understood that the automatic discharge or release of something of value in response to the proper insertion of a record magazine into an associated recorder could comprise any prize or item of value. In the ensuing description, however, such items of value are specifically disclosed as one or more coins such as quarters or the like and hence the mechanism for releasing the same is broadly referred to as a coin discharge mechanism, since coins are usually relatively small and are readily adapted for storage and release. When the term coin discharge is employed, however, it should be understood to connote a device for the discharge of any thing of value whether it is a coin or not, the receipt of which thing of value would furnish an incentive for the collaborator in replacing the "exposed" magazine with another.

It should also be understood that the present invention may be carried out by various means, examples of which are described hereinafter. The detailed features of some of these examples form no part of the present invention but are disclosed and claimed in a copending Krahulec application, Serial No. 57,328 filed concurrently with the present application.

Referring now to Figs. 1 to 5 of the drawings there is illustrated a recording device generally indicated at 30, the details of which have not been illustrated. Essentially such a recording device would comprise suitable driving means for driving a movable recording element or record receiving element such as a record tape or the like and suitable styli or other indicating means for producing a record on the recording element. Since these details form no part of the present invention they have been completely omitted from the disclosure and the label "recorder" is placed on the device 30 to indicate its function.

Figure 23:
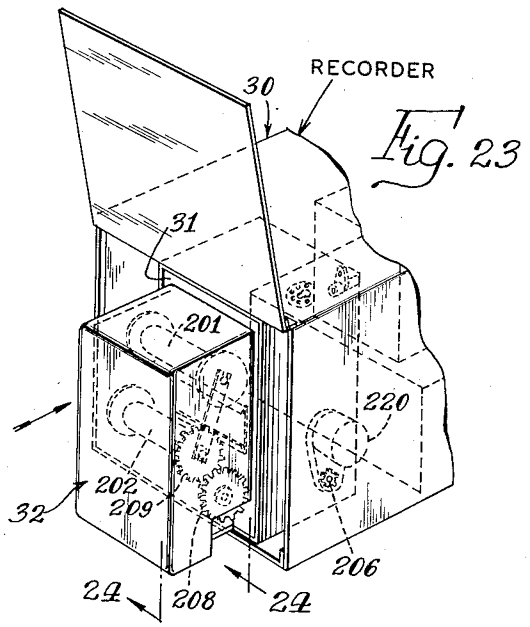
Fig. 23 is a perspective view of a portion of a specific recording device including a mailable magazine ready for insertion into the magazine recess or receptacle of the recorder which recorder may embody the present invention.

The recorder 30 is illustrated as having a recess 31 defined therein for receiving a mailable record magazine generally designated as 32. The mailable record magazine 32 preferably includes a movable recording element therein which is adapted to be driven by suitable driving means when inserted within the recess 31 of the recorder 30. When properly disposed within the recess 31, suitable means such as one or more styli or the like forming either a part of the recorder 30 or solely a part of the magazine 32 are adapted to produce a record on the record receiving element or tape disposed within the magazine 32. The constructional details of such a recorder and associated mailable record magazine for a particular application are disclosed in the above mentioned copending Rahmel application. It will be understood that the recorder 30 and magazine 32 may comprise similar cooperating elements to those disclosed in the above mentioned Rahmel application. For the purpose of providing a complete disclosure a specific recorder such as that disclosed in the above mentioned Rahmel application is illustrated in Figs. 23, 24, 25 and 26 of the drawings which recorder is designated by the reference numeral 30 to relate the recorder 30 of Fig.1 with Figs. 23 to 26 inclusive. This recorder 30 is provided with a magazine receptacle or recess 31 for receiving the magazine 32 which in Fig. 23 is in a position ready for insertion into the magazine receptacle. Actually the recorder 31 may be one in which the record is produced on the record receiving element outside the magazine after which the record receiving element with record indications produced thereon is moved into the magazine so that when the magazine is mailed it will contain a record receiving element with record indications thereon. Such a recorder is disclosed in copending Cordell application Serial No. 17,314, filed March 26, 1948, and also assigned to the same assignee as the present application. In the copending Rahmel application which contains a disclosure substantially identical with that of Figs. 23 to 26 inclusive, the record receiving element is disposed within the magazine at all times and the record is produced thereon while in the magazine.

Figure 24:
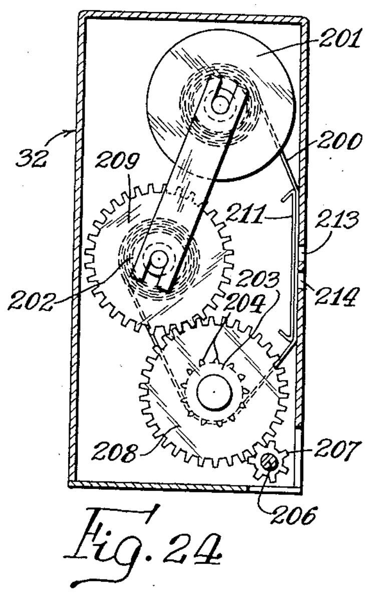
Fig. 24 is an enlarged sectional view taken on line 24—24 of Fig. 23.

Referring now briefly to Figs. 23 to 26 it may be observed that the magazine 32 includes a record receiving element 200 which is moved from a supply spool 201 to a takeup spool 202 by virtue of a rotating sprocket 203 which rotating sprocket is indicated as having suitable teeth 204 engaging with edge perforations in the record receiving element or tape 200. The sprocket 203 is rotated by virtue of rotation of shaft 206 drivingly connected to the sprocket 203 by gears 207 and 208. The takeup spool 202 is also driven by means of a gear 209 meshing with the gear 208. The shaft 206 is driven at a constant speed by a synchronous motor 220. As best illustrated in Fig. 24, the record receiving element or tape 200 moves over a platen 211 closely adjacent one wall of the housing of the magazine 32 which wall is provided with suitable arcuate openings 213 and 214 through which means for producing record indications on said element or tape 200 such as suitable styli designated as 215 and 216, respectively, may extend.

Figure 25:
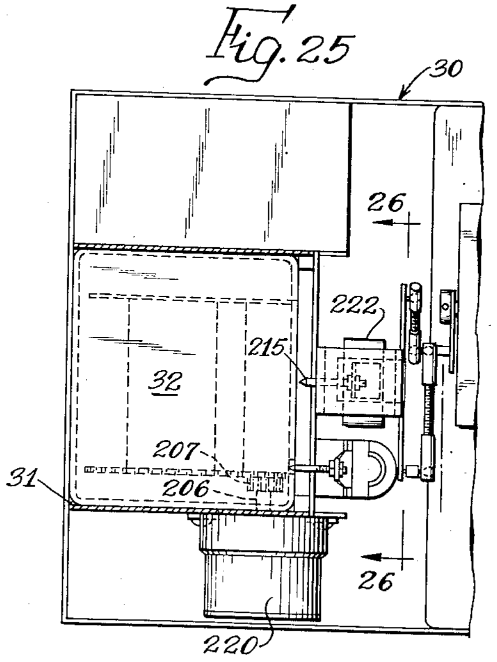
Fig. 25 is a plan view of a portion of Fig. 23 with parts thereof cut away.
Figure 26:
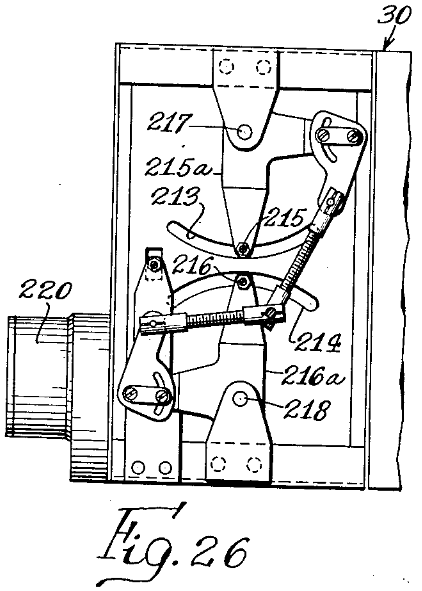
Fig. 26 is a sectional view taken on line 26—26 of Fig. 25.

Referring now to Figs. 25 and 26, the styli 215 and 216 are mounted on suitable bellcranks 215*a* and 216*a* pivotally mounted at 217 and 218 respectively. These styli are connected by suitable linkage means to a synchronous motor, not shown, so as to be moved through an arcuate path somewhat determined by the openings 213 and 214 in the housing of the magazine 32. Suitable means such as an electromagnet 222 is provided to cause the stylus 215 to move into engagement with the record receiving element under predetermined conditions thereby to produce record indications thereon. A similar electromagnet, not shown, for the stylus 216 is also provided. Preferably suitable biasing means prevent the styli 215 and 216 from engaging the record receiving element 200 unless the associated electromagnet such as 222 is energized.

For the purpose of moving the record receiving element there is provided in the recorder 31 a second constant speed motor 225 which is connected to rotating shaft 205 and consequently gear 207. As is best shown in Fig. 23, this driving connection for moving the record receiving element is completed when the magazine 32 is moved to its substantially fully inserted position, whereupon gears 207 and 208 are drivingly related. Also when the magazine 32 is inserted into the magazine receptacle the styli 215 and 216 are effectively moved to a position relative to the record receiving element 200 as to be effective to produce record indications thereon when the associated electromagnets are energized.

It should be understood that the recorder described above is merely representative of recorders with which the present invention may be associated. As a matter of fact, the present invention might equally well be associated with a recorder of the type shown in the copending Cordell application referred to above as well as with recorders of the type disclosed in a copending Krahulec application, Serial No. 147,302, filed March 2, 1950, and also assigned to the same assignee as the present application.

With the above brief description of the recorder 30 including magazine 32 deference may now again be had to Figs. 1 to 5 of the drawings where the recorder is merely schematically designated. For the purpose of permitting ready insertion and removal of the magazine 32 with respect to the recorder 30, the magazine 32 is provided with a pair of annular protrusions 33 which can readily be grasped by the collaborator's fingers while inserting and removing the magazine. To receive the protrusions 33, the portion of the recorder defining the recess 31 is provided with notched out portions 34. With this arrangement the manually graspable portions or annular protrusions 33 are readily available even though the record magazine 32 may be disposed within the recess 31 of the recorder 30.

Figures 1, 2, 3, 4, 5:
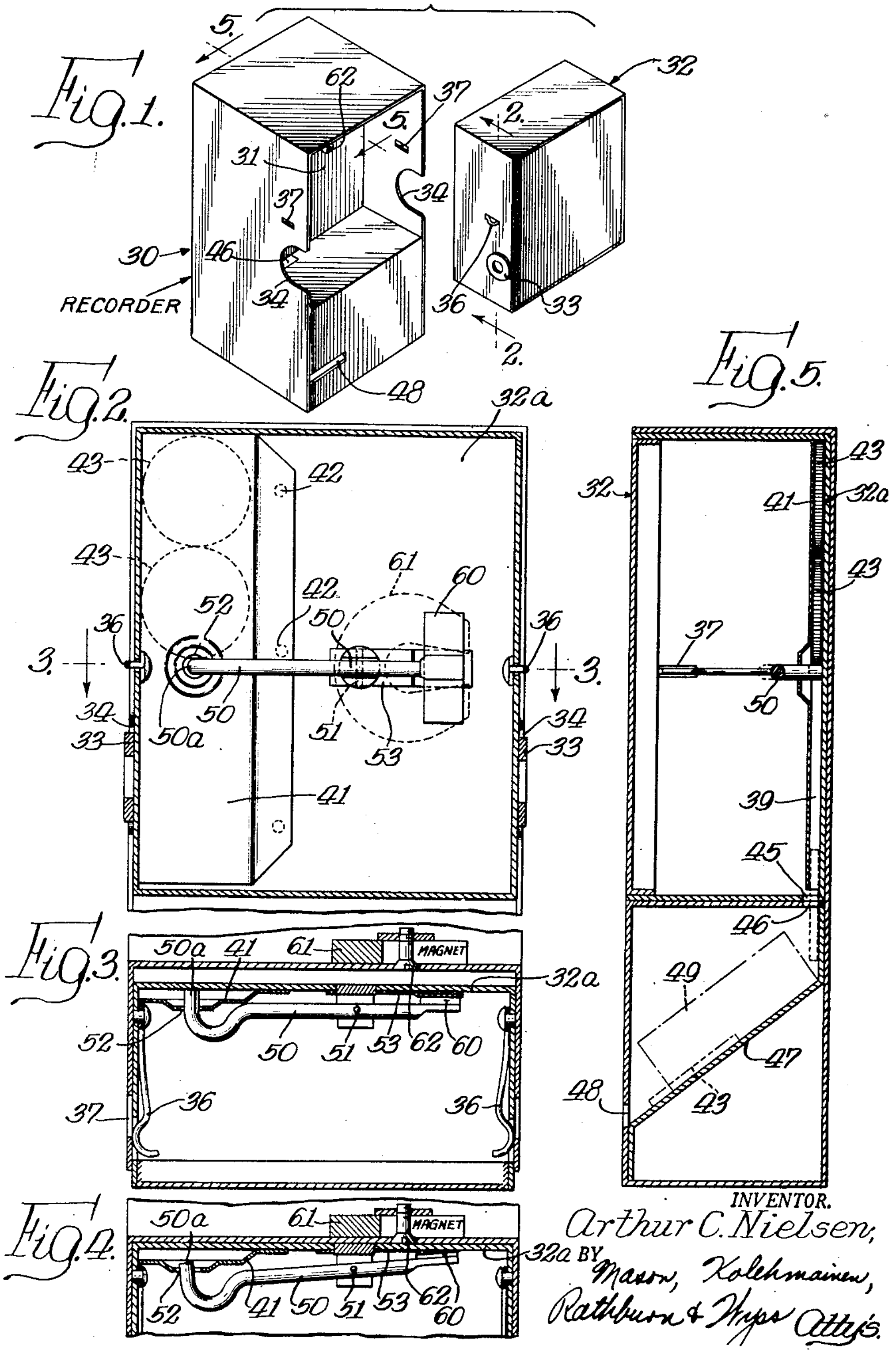
Fig. 1 is a perspective view of a recorder and mailable magazine employing the present invention with the magazine shown removed from the recorder.
Fig. 2 is a sectional view through the magazine and a portion of the recorder taken substantially on line 2—2 of Fig. 1 assuming however that the magazine is disposed in its proper position when associated with the recorder.
Fig. 3 is a sectional view taken on line 3—3 of Fig. 2, assuming
Fig. 4 is a view similar to Fig. 3 with the magazine completely inserted and the coin discharge mechanism actuated to discharge the coins contained therein.
Fig. 5 is a sectional view of the recorder taken substantially on line 5—5 of Fig. 1 but with the magazine disposed therein in the manner shown in Fig. 4 of the drawings showing the coins in their properly retained position and also during the process of discharge.

It will be understood that the magazine 32 should be retained in the recess 31 against inadvertent or accidental removal therefrom. Any suitable means for this purpose may be employed and in some cases the driving means within the recorder which drivingly engages the means for moving the record tape within the record magazine 32 may perform this function. As illustrated in the drawings, however, the magazine is provided with spring like detents 36 on either side thereof which are adapted to engage with cooperating openings 37 defined in the walls of the recess 31. In Fig. 3 of the drawings it may be observed that the detents 36 have not quite been moved into the openings 37 since the magazine is not completely inserted into the recess 31. Upon complete insertion of the magazine the detents releasably retain the magazine 32 within the recess 31. This position of the detents is clearly shown in Figs. 2 and 5 of the drawings.

It will be understood that several means for causing release of any coins retained in the magazine 32 may be employed. For example the coins may be discharged in response to the release of energy stored in a spring. Such an arrangement is disclosed in Figs. 6 to 10 for example. It will also be understood that the coins could be positioned in a manner so that gravity is effective to cause discharge thereof. Such an arrangement is disclosed in the modification shown in Figs. 1 to 5 of the drawings. As illustrated there is defined along one wall, such as for example the rear wall 32*a* of the magazine 32, which may be considered the wall adjacent the bottom of the recess 31, a vertical channel 39 defined by the rear wall 32*a* of the record magazine 32 and a member 41 suitably fastened as indicated at 42 to the rear wall 32*a*. Preferably this channel 39 is of such size as to suitably support in stacked relationship one or more coins designated as 43, in Figs. 2 and 5 of the drawings, which coins may preferably comprise quarter dollars for example. In Figs. 2 and 5 of the drawings two coins 43 are indicated as releasably held near the upper end of the channel 39. The lower end of the channel 39 is preferably open and disposed over aligned openings 45 and 46 defined in the record magazine 32 and the recorder 30 respectively. When released the coins are adapted to fall through the openings 45 and 46 into the lower part of the recorder 30 and onto an inclined slide 47 which guides the coin toward a discharge opening 48 defined near the lower front of the recorder as best shown in Figs. 1 and 5 of the drawings. The slide 47 may be provided with suitable guide portions 49 properly to guide each coin so that it may slide through the opening 48 where it may be received by the collaborator upon insertion of the magazine 32 into the recess 31.

For the purpose of releasably maintaining the coins 43 within the channel 39 there is provided a supporting member 50 in the form of a rod or wire pivotally supported as indicated at 51 to the rear wall 32*a* within the magazine 32. One end of the pivoted member 50 is provided with a bent portion 50*a* adapted to extend through a suitable opening 52 in the member 41 into the channel 39. When the portion 50*a* of the pivotal member 50 extends into the channel 39 it prevents the movement of a coin through the channel 39 and actually supports or holds the lowermost coin 43 shown in Fig. 5 of the drawings. It will be apparent that withdrawal of the portion 50*a* of the member 50 from within the channel 39 to the position shown in Fig. 4 of the drawings will permit the coins 43 to fall freely through the aligned openings 45 and 46 and along the slide 47 so as to be discharged through the opening 48. Preferably the pivotally mounted member 50 is biased by any suitable means, such for example as the spring 53, so as to assume its supporting position shown in Figs. 2, 3 and 5 of the drawings.

Any suitable means may be provided for moving the pivotal arm 50 from the position shown in Fig. 3 to the position shown in Fig. 4 of the drawings, in response to the insertion of the record magazine 32 into the recess 31. Such actuating means might be mechanical as is disclosed for example in the arrangement shown in Figs. 11 to 15 of the drawings. For the purpose of avoiding the employment of any protruding pin or the like, the supporting member 50, in Figs. 1 to 5 of the drawings, is released from its supporting position by a magnetic means in the following manner. The end of the member 50 remote from the supporting portion 50*a* is provided with an armature portion 60. Preferably the housing of the recorder 30 and the housing of the record magazine 32 are constructed of a non-magnetic material such as a plastic, aluminum or the like. Suitably supported within the recorder 30 and adjacent the rear wall thereof is a magnet specifically illustrated as a horseshoe type magnet 61 which, as illustrated, is clamped to the bottom wall of the recess 31 by a suitable clamping screw 62. The coercive strength of the magnet 61 is such that prior to substantially complete insertion of the magazine 32 within the recess 31 the coercive force is insufficient to attract the armature 60 against the biasing force of the spring 53. As the magazine 32 is moved from the position shown in Fig. 3 of the drawings to the position shown in Fig. 4 of the drawings the coercive force is sufficient to attract the armature 60 with the result that the coins 43 are automatically released in response to insertion of the magazine 32 into the recess 31.

In view of the detailed description included above the operation of the device shown in Figs. 1 to 5 of the drawings will readily be understood. If, for example, the recorder 30 is used to record information pertinent to the statistical analysis, the analysis organization will when reloading the magazine 32 with a new record tape, or other recording element, for example, insert the coins 43 and see that the spring 53 biases the holding portion 50*a* of the member 50 to the position shown in Figs. 3 and 5 of the drawings. If desired a suitable spring may be employed within the channel 39 as is shown for example in some of the other modifications of the present invention described hereinafter to prevent rattling of the coins during mailing thereof. Upon receipt of the magazine the collaborator who is anxious to receive the coins contained therein removes the magazine associated with the recorder 30 and replaces it with the magazine received from the analysis organization, subsequently mailing the replaced magazine to the analysis organization. Since the coin discharge mechanism is, except for the magnet 61 completely disposed within the record magazine 32 it is under the direct control of the analysis organization. It is of course necessary to remove the record tape contained therein and consequently little extra effort is involved if at the same time the coins 43 are inserted for subsequent discharge to the collaborator. The construction of the arrangement disclosed in Figs. 1 to 5 is such that discharge of the coin by means other than employing the magnet is substantially impossible and since the collaborator does not know what causes the discharge of the coins, he is not likely to discharge the coins without inserting the magazine in the intended manner.

It will be apparent therefore that there has been provided a simple and inexpensive coin discharge mechanism for mounting within a mailable record magazine which requires a minimum of space, does not substantially increase the weight of the magazine and which is substantially foolproof in operation.

The arrangement described above is admirably suited to insuring prompt mailing or return of the magazine 32 to the analysis organization. As illustrated the coin discharge device is capable of discharging two quarters, for example, in response to insertion of the magazine 32 into the recess 31. If the previous magazine was not returned promptly, the analysis organization might put only a single quarter into the next magazine which will serve as a reminder that prompt return of the magazine will insure the receipt of two quarters instead of one. With this arrangement it is very likely that return of the magazine within a scheduled time will occur. Furthermore, in practically every collaborator's home, whether it be a wealthy home or otherwise, there is usually some person who will eagerly perform the task of changing the magazines for the reward in the form of the coins discharged upon proper insertion thereof. This person might be a child, a servant or any one else. Consequently the above arrangement insures not only prompt insertion of the cartridge or magazine into the recorder, but furthermore prompt mailing of the removed magazine, both being essential to the best interests of the analysis organization.

With the arrangement described above, the coins which are discharged are loaded into the magazine by the analysis organization each time that the recording element or record tape is replaced or removed. It should be understood that the coins to be discharged might be stored in the recorder itself rather than in the magazine and be automatically released therefrom upon proper insertion of the magazine. This latter arrangement has the disadvantage in that the discharge of one coin instead of two coins when prompt mailing has not occurred during the preceding period cannot be accomplished as readily. Furthermore, replacement of the coins in the recorder requires an employee of the analysis organization periodically to visit the recorder. Also any simple means for causing release of the coins stored in the recorder could no doubt be actuated by removing and replacing the same magazine which the collaborator would soon learn, and consequently the coin supply could be exhausted without performance of the required function.

Although in the arrangement described above a magnetic release mechanism was employed to permit the coins or tokens to be discharged under the force of gravity, it will be understood that a spring discharge means which does not rely upon gravity might equally well be employed. In Figs. 6 to 10 of the drawings there is disclosed a recorder mechanism employing the coin or token discharge feature of the present invention wherein a magnetic coin release arrangement is employed but spring means rather than gravity are relied upon to insure discharge of the coins.

Figures 6, 7, 8, 9, 10:
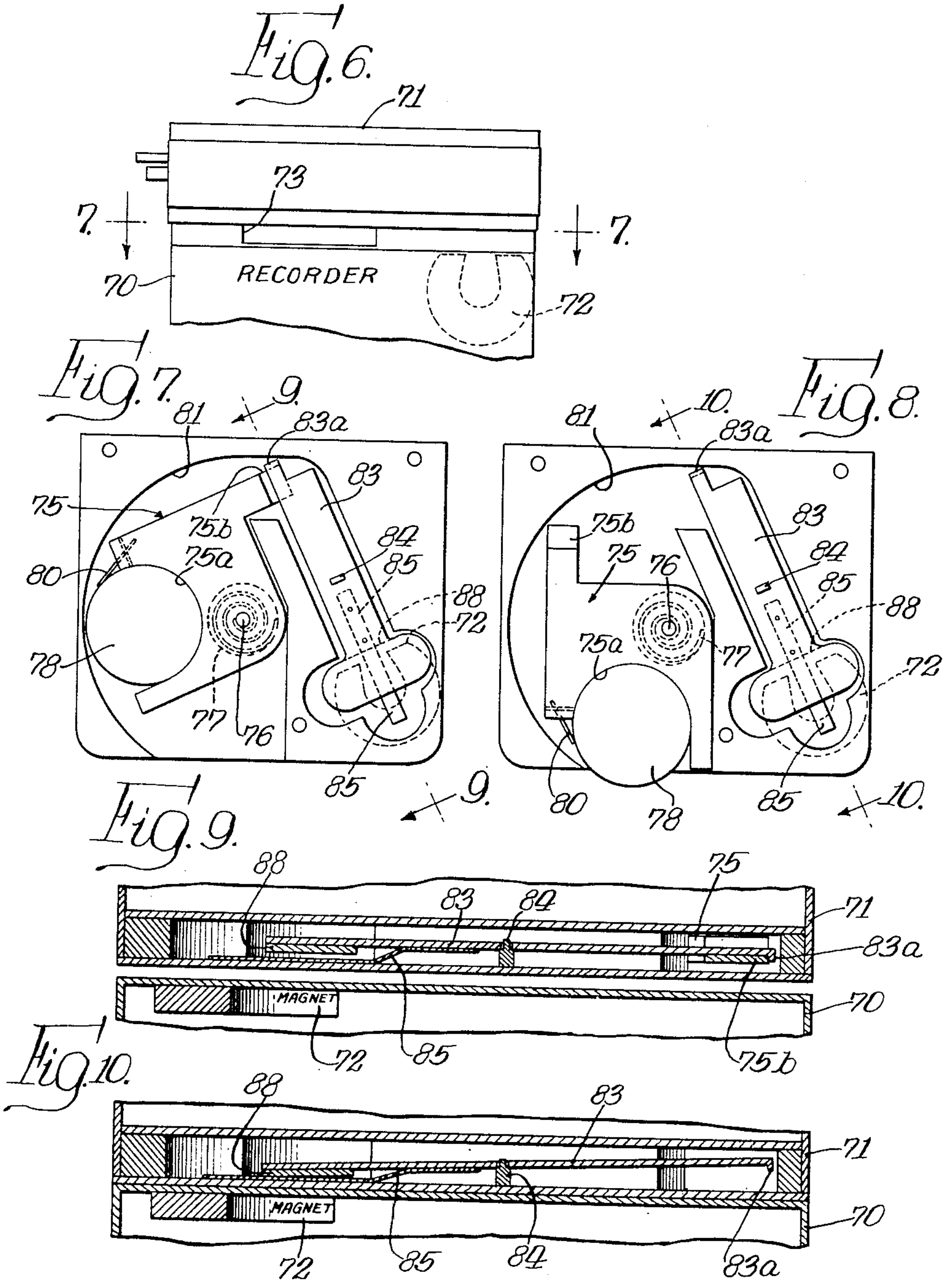
Fig. 6 is a partial view of a recorder and an associated magazine illustrating a modification of the present invention.
Fig. 7 is a view of the magazine taken on line 7—7 of Fig. 6 with the coins in the loaded position prior to discharge and consequently prior to complete association of the magazine with the recorder.
Fig. 8 is a view similar to Fig. 7 showing the coins in the released position.
Fig. 9 is a sectional view taken on line 9—9 of Fig. 7.
Fig. 10 is a sectional view taken on line 10—10 of Fig. 8.
Figures 11, 12:
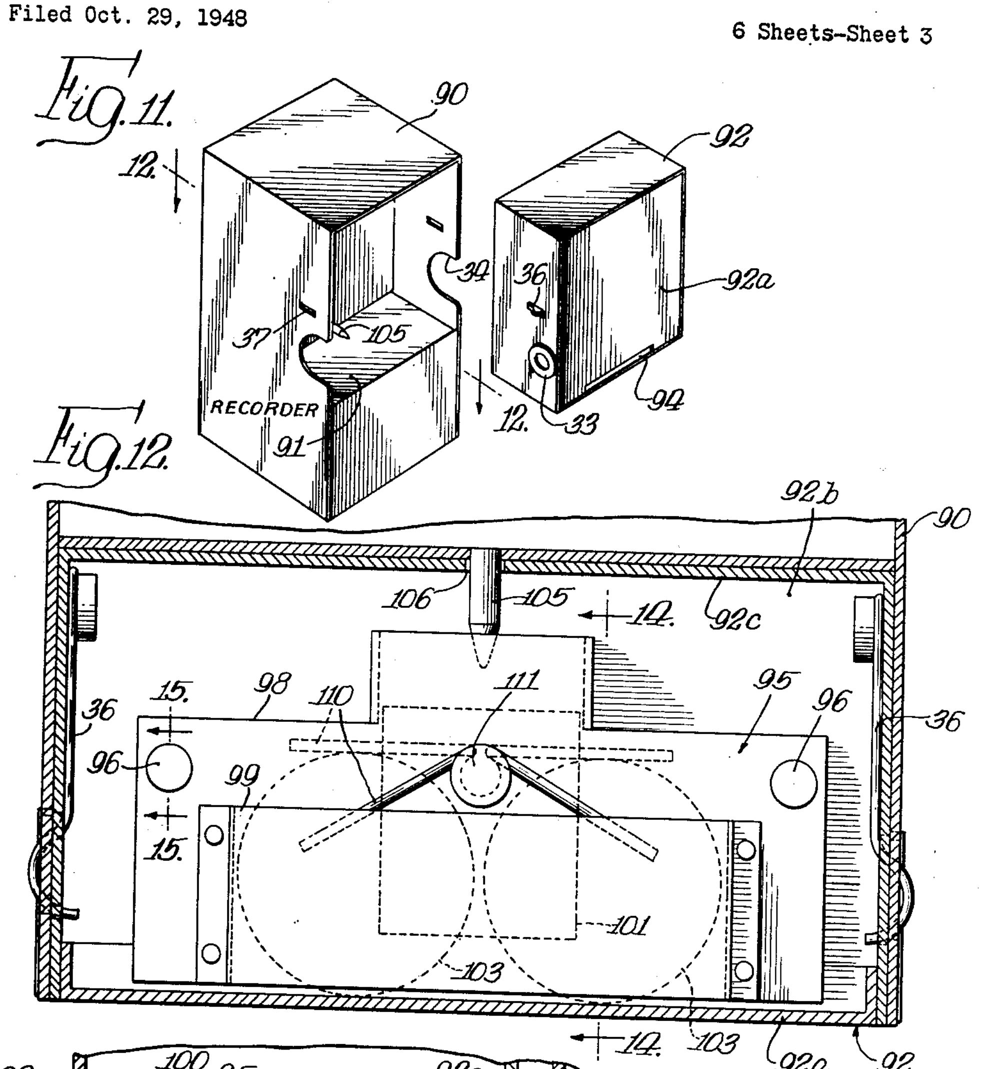
Fig. 11 is a perspective view similar to Fig. 1 showing another modification of the present invention with the magazine removed from the recorder.
Fig. 12 is an enlarged sectional view taken substantially on line 12—12 of Fig. 11 assuming that the magazine is inserted in its proper position in the recorder.

Referring now to Figs. 6 to 10 of the drawings, there is illustrated in Fig. 6 a small portion of the recorder generally designated at 70 with which is associated in any suitable manner a mailable magazine 71. Associated with the recorder 70 adjacent the portion thereof contiguous with the magazine 71 is a permanent magnet 72 (schematically shown in Fig. 6), for magnetically releasing the coins or tokens when the magazine is appropriately associated with the recorder.

As illustrated the magazine 71 is provided with means defining a coin discharge opening 73. Disposed within the portion of the magazine 71 adjacent the recorder 70 and also adjacent the coin discharge opening 73 is a suitable coin carriage mechanism 75 pivotally mounted as indicated at 76. A suitable torsion spring 77 associated with the pivot 76 normally biases the carriage 75 to the discharged or released position shown in Fig. 8 of the drawings where a coin or other token 78 extends partially out of the coin discharge opening 73 so that it may readily be grasped manually by the collaborator's fingers. Preferably the carriage 75 is provided with a curved recess 75a for receiving one or more coins 78. A suitable spring member 80 is provided to grip the edge of the coin so that it may be retained in the coin carriage 75 in a manner firm enough to prevent rattling when the magazine is mailed but not sufficiently firm to prevent the ready removal thereof when grasped by the collaborator. Preferably the portion of the magazine 71 housing the coin discharge mechanism includes a recess 81 for receiving the coin carriage 75 and the coins 78 of sufficient area to permit pivotal movement thereof. This recess is so designed that even if the spring 80 for holding the coin were not provided, the coin would more or less be held in position by the edge of the recess until moved into the discharge opening 73 as shown in Fig. 8 of the drawings.

In order releasably to maintain the coin carriage 75 in the position shown in Fig. 7 of the drawings, there is provided a latch lever 83 mounted for tilting movement upon a suitable support 84 disposed within the magazine 71. A suitable leaf spring 85 fastened to one wall of the magazine and engaging the latch 83 as clearly shown in Fig. 9 of the drawings, normally biases the latch 83 to the latching position shown in Fig. 9 of the drawings. One end of the latch lever 83 is provided with a latch portion 83a adapted to engage an extension 75b of the coin carriage 75. The latching engagement of the latch 83 and the coin carriage device 75 is clearly shown in Figs. 7 and 9 of the drawings.

The other end of the latch member 83 is provided with an armature 88 which is disposed in a manner so as to be closely adjacent to the permanent magnet 72 when the magazine 71 is associated with the recorder 70. Fig. 9 shows the relative positions of the recorder and the magazine parts prior to proper association of the magazine with the recorder, and Fig. 10 shows the parts of the coin discharge mechanism when the magazine is properly associated with the recorder. It is noted that in Fig. 9 the coercive force of the magnet 72 is insufficient to attract the armature 88 and consequently the coin carriage 75 is maintained in a position so that the coins 78 are not accessible. When the magazine 71 has been moved to the position shown in Fig. 10 of the drawings, the armature 88 is within the coercive range of the magnet 72 and the latch member 83 is moved to the indicated position whereupon the coin carriage 75 is pivoted to the position shown in Fig. 8.

It may be noted that with the arrangement disclosed in Figs. 6 to 10 of the drawings the insertion of a tool through the opening 73 to release the coins disposed within the coin carriage 75 will be unsuccessful and if anything will only more firmly latch the mechanism thereby insuring against inadvertent or undesirable removal of the coins from the magazine 71.

It will be apparent that the arrangement disclosed in Figs. 6 to 10 is in many respects similar to the arrangement disclosed in Figs. 1 to 5 except that the mechanism is designed so that a spring 77 moves the coins from the retained to the discharged position as contrasted with employing gravity for this purpose in the earlier described arrangement.

The operation of the arrangement disclosed in Figs. 6 to 10 of the drawings will be obvious to those skilled in the art in view of the detailed description included above.

Referring now to Figs. 11 to 15 inclusive of the drawings, there is disclosed an arrangement somewhat similar to that shown in Figs. 1 to 5 of the drawings where gravity is relied upon to cause discharge of the coins or tokens. However, instead of employing a magnetic release for causing the discharge of the coins a mechanical release is employed. As illustrated there is provided a recorder 90 having defined therein a recess 91 for receiving a mailable magazine 92. The corresponding parts of the recorder 90 and the magazine 92 are designated by the same reference numerals as in Fig. 1 of the drawings.

The lower end of the magazine 92 on the front wall 92*a* thereof which is exposed when inserted into the recess 91 is provided with a coin discharge opening 94. A suitable coin carriage 95 is mounted within the magazine 92 adjacent the coin discharge opening 94 which carriage is mounted for limited tilting movement upon a pair of pins 96 which prevent movement of the coin carriage 95 in a direction parallel to the plane thereof but permit limited movement in a direction transverse to the plane thereof. The pins 96 are supported on the bottom wall 92*b* of the magazine 92. As illustrated the carriage 95 comprises a somewhat T-shaped member 98 to which is fastened the member 99 defining a coin chamber 100 therebetween having an open edge 100*a* for the discharge of a coin therethrough. The limited movement of the coin carriage 95 is readily illustrated by referring to Figs. 13, 14 and 15, the two extremes of the movement being shown in Figs. 13 and 14 respectively. One of the pins 96 fastened to the bottom wall 92*b* of the magazine 92 is clearly shown in Fig. 15 and the two positions of the T-shaped plate 98 are indicated.

Figures 13, 14, 15:
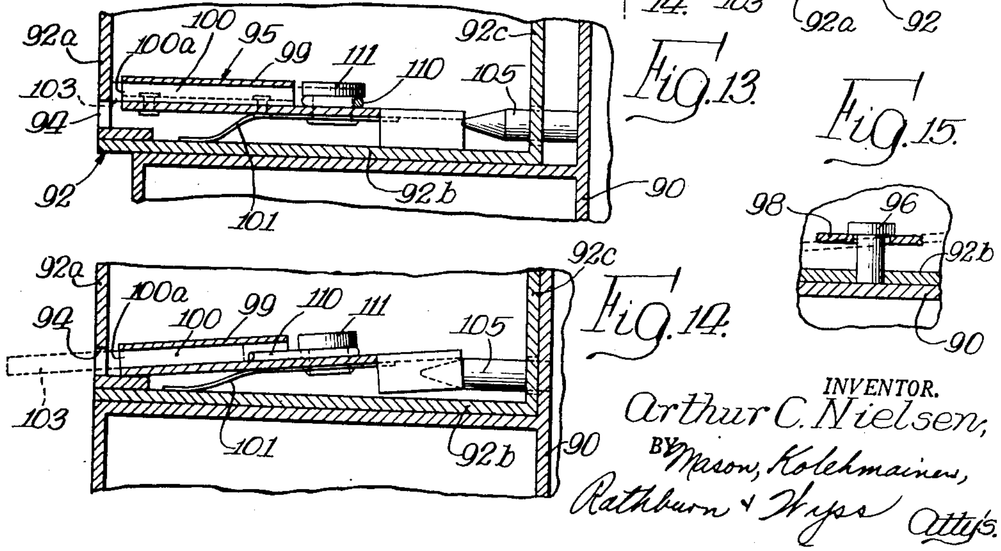
Fig. 13 is a partial sectional view taken substantially on line 14—14 of Fig. 12 assuming
Fig. 14 is a partial sectional view taken on line 14—14 of Fig. 12.
Fig. 15 is a partial sectional view taken on line 15—15 of Fig. 12.

In accordance with the present invention a suitable biasing spring 101, illustrated as a leaf spring, is interposed between the coin carriage 95 and the wall 92*b* so as normally to bias the coin carriage to the position shown in Fig. 13 of the drawings. In this position the coin chamber 100 is disposed above the coin discharge opening 94 so that if any force were applied to the coins, designated at 103 in Fig. 12 of the drawings, to cause them to move out of the coin chamber 100 through the open end 100*a* thereof they would engage the inside of the wall 92*a* of the magazine 92.

For the purpose of causing the release or discharge of the coins when the magazine is inserted into the recess 91 of the recorder 90 there is mounted within the recess 91 a pin 105 having a pointed end adapted to be inserted through an opening 106 in the wall 92*c* of the recorder 92. The pin is positioned high enough so that when the coin carriage 95 is in the position shown in Fig. 13 of the drawings the pointed end thereof will move under the T-shaped plate 98 as indicated in Fig. 13, and further insertion of the magazine 92 into the recess 91 will cause the carriage 95 to tilt from the position shown in Fig. 13 to the position shown in Fig. 14 whereupon the opening 100*a* of the coin chamber 100 is opposite the coin discharge slot 94 and gravity will cause the coins to slide out of the chamber 100 and be discharged through the opening 94.

If desired a suitable spring 110 (see Fig. 12) may be provided mounted upon a pin 111 to act as an anti-rattle device in maintaining the coins in the firmly held manner for mailing purposes. This spring 110 may also assist gravity in the discharge of the coins if desired.

The arrangement disclosed in Figs. 11 to 15 inclusive is a very simple arrangement of rugged, foolproof construction. However, the previously described arrangements are sometimes preferred in those situations where the collaborator or some other person might come into contact with the pin 105 which might injure his hand or the like. This danger is completely eliminated with the magnetic release device described above.

In the arrangement described heretofore the coin discharge mechanism was actuated merely in response to the association of the magazine with the recorder. In some applications it might be desirable to require the person replacing the magazine to perform an additional chore or duty and in such a case it might be advantageous to have the insertion of the magazine into the recorder merely condition the release of the coins, but to prevent actual release until the further act has been performed.

Figure 16:
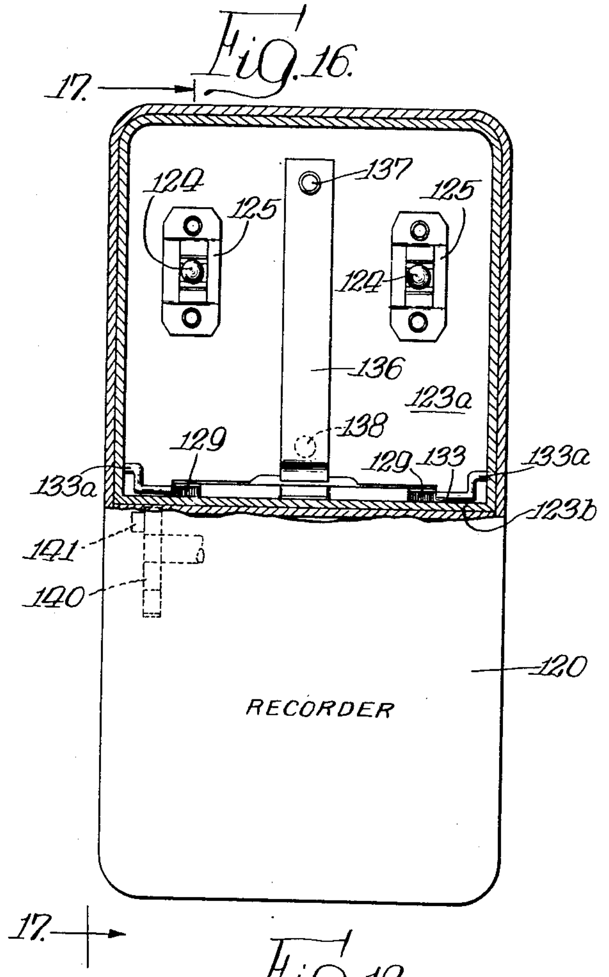
Fig. 16 is a view partly in section of another recording device employing a modification of the present invention.
Figure 17:
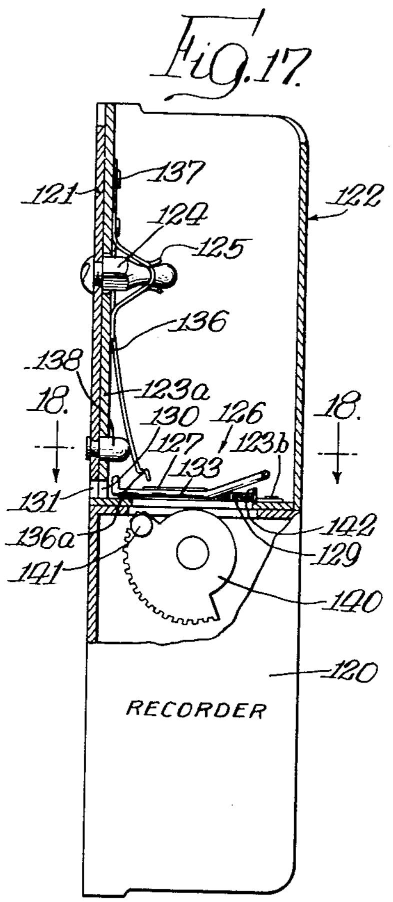
Fig. 17 is a partial sectional view looking in the direction of the arrows 17—17 of Fig. 16.
Figure 18:
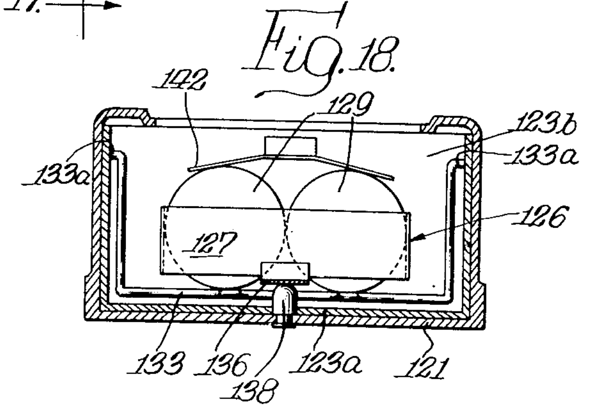
Fig. 18 is a sectional view taken on line 18—18 of Fig. 17, assuming
Figures 19, 20, 21, 22:
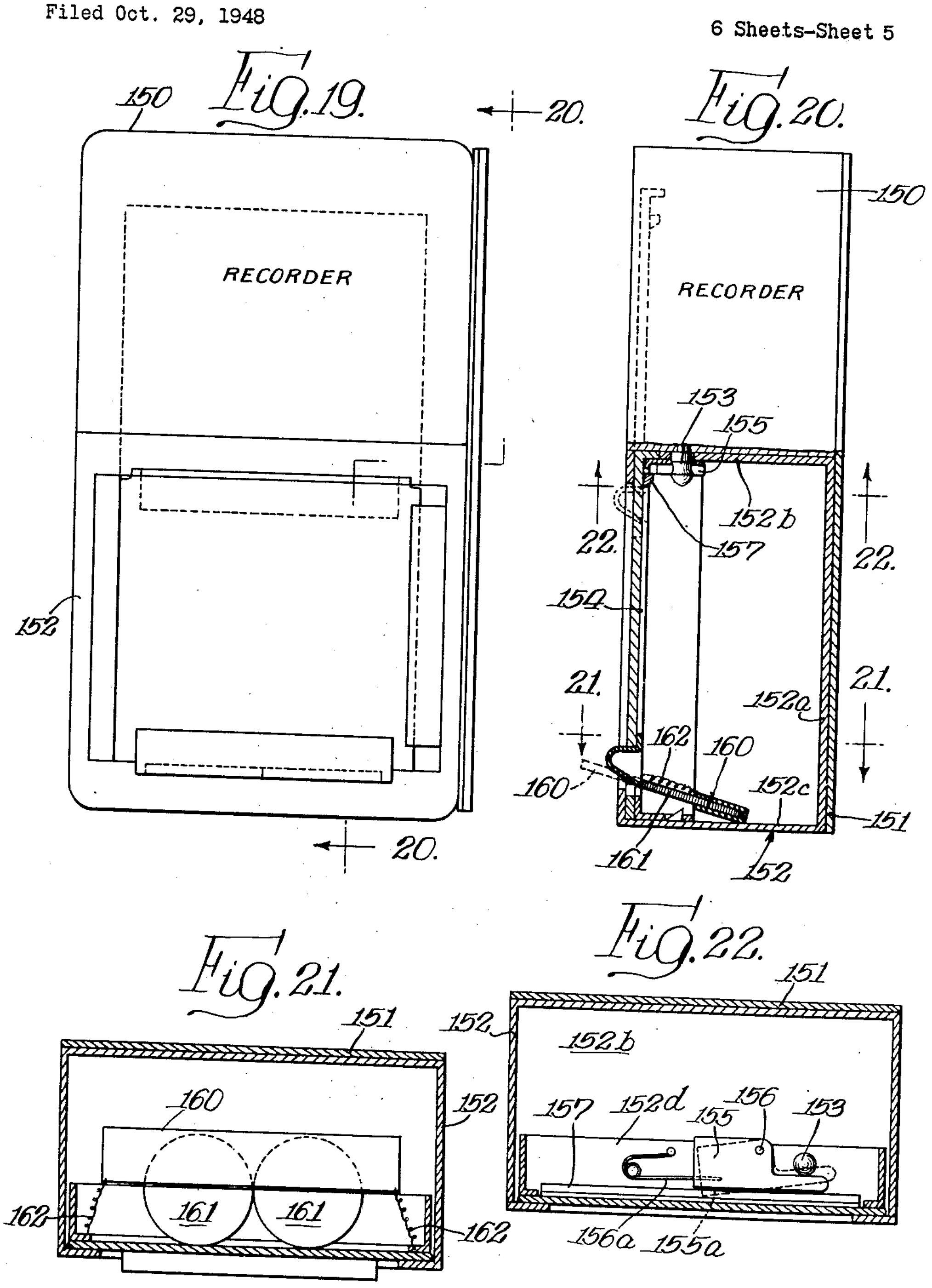
Fig. 19 is a top view of another recording device embodying a modification of the present invention.
Fig. 20 is a partial sectional view taken on line 20—20 of Fig. 19.
Fig. 21 is a sectional view taken on line 21—21 of Fig. 20.
Fig. 22 is a sectional view taken on line 22—22 of Fig. 20.

In Figs. 16 to 18 of the drawings there is disclosed such an arrangement in which there is indicated generally a recorder 120 which includes a base comprising an extension 121 of the base thereof which extension serves as a support or base for a magazine 122. Preferably the magazine includes a bottom wall 123*a* which is adapted to be moved against the base 121 when the magazine is associated with the recorder. For the purpose of holding the magazine in its position against the base 121, the base may be provided with lugs 124 extending through suitable openings in the wall 123*a* into the magazine 122, which lugs are engageable by spring clips 125 suitably fastened to the wall 123*a* by riveting, welding or the like. In order to simplify the disclosure the parts of the recording mechanism have been completely eliminated both from the recorder and the magazine and only the elements essential to the coin discharge mechanism are illustrated.

In accordance with the present invention there is provided a coin chamber 126 which is disposed within the magazine 122 on the wall 123*b* thereof which is adjacent the recorder 120. The coin chamber 126 is defined by the wall 123*b* and a member 127 suitably fastened thereto so as to provide a chamber of proper configuration to receive and hold a pair of coins such as indicated at 129 in Fig. 18 of the drawings. The bottom wall 123*a* of the magazine 122 is provided with an opening or slot 130 which is aligned with a slot 131 in the extension 121. If the coins are not positively retained in the coin chamber 126, they will fall by force of gravity through the aligned openings 130 and 131, when the magazine is in its normal position shown in Fig. 18 of the drawings.

In accordance with the present invention the coins 129 are prevented from sliding out of the coin chamber 126 by means of a retaining wire 133 in the form of a U-shaped wire member whose ends are bent to form trunnions 133*a* which are pivotally mounted in the side walls of the magazine 122. When the wire 133 is moved to the position shown in Figs. 16 and 17 of the drawings it interferes with the movement of the coins out of the coin chamber 126.

To releasably hold the U-shaped wire in the position shown in the drawings a latching spring 136 is provided. One end of the spring 136 is suitably fastened as indicated at 137 to the bottom wall 123a of the magazine 122 in such a position that a hooked shaped end 136a thereof is disposed adjacent to the U-shaped retaining wire 133 and adapted for limited relative movement with respect thereto. Preferably the spring latch 136 has sufficient inherent resilience so as to lie flat against the bottom wall 123a whereupon the end 136a thereof engages the bottom portion or bight of the retaining wire 133 so as to hold it in an interfering position with respect to the coins 129.

For the purpose of initiating the release of the coins 129 there is provided on the base or extension 121 a pin 138 adapted to extend through a suitable opening defined in the bottom wall 123a of the magazine 122 when the magazine is associated with the recorder 120, as illustrated in Figs. 16 to 18 of the drawings. This pin 138 is adapted to engage the spring latch 136 and to move it out of its latching position as is clearly shown in Figs. 17 and 18 of the drawings. When this occurs the retaining wire 133 is free to move out of its retaining position to permit the coins 129 to drop by gravity through the aligned openings 130 and 131.

In accordance with the present invention, however, the association of the magazine 122 with the recorder 120 merely conditions the retaining wire 133 for movement to release the coins and an additional act must be performed to actually move the retaining wire 133 out of its coin retaining position. Such additional act might comprise any one of a myriad of acts of interest to a recording operation and the specific type of act is of no interest as far as the present invention is concerned. The performance of such an act may, for example, actuate a rotatable member 140 suitably mounted for rotation within the recorder 120. As illustrated the rotatable member 140 is provided with a pin 141 which upon rotation of the member 140 is adapted to move through suitable openings defined in the walls between the recorder 120 and the magazine 122 to engage the wire 133 and move it out of its retaining position, whereupon the coins 129 are free to move through the aligned openings 130 and 131. If desired a suitable anti-rattle spring or device 142 may be incorporated in the magazine 122 to prevent the coins within the coin chamber 126 from rattling during mailing thereof.

From the above description it will be apparent that the device disclosed in Figs. 16 to 18 requires an additional act to be performed besides associating the magazine with the recorder before discharge of the coins 129 is obtained. With this arrangement it is apparent that the insertion of a tool to release the latch spring 136 will not discharge the coins and it is unlikely that the collaborator will be able to inadvertently cause release of the coins without performing the two operations required of him.

In Figs. 19 to 22 of the drawings there is illustrated a modification of the arrangement disclosed in Figs. 16 to 18 of the drawings wherein again besides properly associating the magazine with the recorder an additional act must be performed before discharge of the coins is occasioned. As illustrated in Figs. 19 to 22 inclusive there is provided a recorder 150 having an elongated base portion 151 very similar to that provided in the recorder disclosed in Figs. 16 and 18, which elongated base portion 151 is adapted to act as the base for removably supporting a mailable record magazine 152. The magazine 152 is illustrated as having a bottom wall 152a, end walls 152b and 152c, and a slidable top or cover member 152d. When the magazine 152 is associated with the recorder a suitable pin 153 supported on the recorder 150 is adapted to be inserted through a cooperating opening in the wall 152b of the magazine 152. As illustrated the magazine 152 is associated with the recorder 150 by sliding it along the base or extension 151 until the pin 153 is inserted into the opening therefor defined in the wall 152b of the magazine 152.

As illustrated the cover 152d of the magazine 152 is normally latched in the closed position by virtue of a pivotally mounted latch 155, pivotally mounted as indicated at 156 to the wall 152b of the magazine 152 and disposed within the magazine 152. Normally the pivotally mounted latch 155 is biased by the spring 156a to the dotted position shown in Fig. 22 of the drawings. In this dotted line position the corner 155a of the latching member 155 is moved into a position to engage a flange or latch 157 mounted on the underside of the movable cover 152d. Normally, therefore, the latching member 155 when in the dotted line position shown in Fig. 22 holds the cover 152d in the closed position. Upon association of the magazine 152 with the recorder 150 the pin 153 is adapted to move the latching member 155 to the solid line position shown in Fig. 22 of the drawings, whereupon it is possible to open the cover 152d. From the above description it will be apparent that the additional function or act to be performed in the mechanism disclosed in Figs. 19 to 22 of the drawings is the opening of the cover 152d whereupon suitable coins or tokens are made available. To this end there is disposed within the magazine 152 a coin supporting channel 160 adapted to clampingly receive in a releasable manner a pair of coins 161. A suitable spring 162 preferably biases the channel 160 so as to move the coins 160 outside the magazine upon opening of the cover 152d to the position shown in dotted lines in Fig. 20 of the drawings. The analysis organization would place the coins within the channel 160 which clamps them sufficiently to prevent their rattling but permits ready removal thereof by the collaborator. Also the cover is closed by the analysis organization, and during the closing operation the latching member 155 engages the latch 157 to lock the cover in the closed position until the magazine is properly inserted in the recorder 150 whereupon the cover 152d may be opened and the coins 160 released to the collaborator.

Although there has been illustrated a simple latching arrangement it will be understood that if desired a more complicated latching arrangement comprising several pivotal latching members somewhat in the form of a tumbler lock may be employed to prevent the insertion of a tool or pin of ordinary construction into the magazine to release the latching means rather than to require the association of the magazine with the recorder to obtain such release.

In view of the detailed description included above the operation of the arrangement disclosed in Figs. 19 to 22 will be readily understood by those skilled in the art and no further discussion thereof is included herewith.

From the above description it will be noted that there have been provided numerous embodiments of the present invention for insuring not only the proper association of the mailable record magazine with its recorder but the prompt mailing thereof to an analysis organization. Furthermore in addition to associating the recorder with the magazine an additional step or act may be required to be performed by the collaborator before something of value is made available to him. In this manner the analysis organization for a very low cost has an important step in its operation performed for it thereby greatly reducing the cost of producing the final result by the analysis organization.

While there have been disclosed numerous embodiments incorporating the present invention, it will be understood that many changes and modifications will suggest themselves to those skilled in the art. It is intended in the appended claims to cover all such changes and modifications as fall within the true spirit and scope of the present invention.

What is claimed as new and desired to be secured by Letters Patent of the United States is:

1. A recording device including means defining a magazine receptacle, said recording device including a mailable record magazine insertable into said receptacle and means for producing record indications on a record receiving element in said recording device, means responsive to the insertion of said magazine into said receptacle for rendering said recording means effective to produce record indications on said element, said record receiving element being disposed in said magazine at least after said record indications are on said element, coin releasing means forming a part of said recording device, means for retaining one or more coins or tokens in said coin releasing means, and coin release actuating means in said recording device responsive to substantially complete insertion of said magazine into said receptacle for actuating said coin release means whereby a coin or token is released from said recording device.

2. In combination with a recording device comprising means defining a magazine recess, said recording device including a mailable record magazine capable of being disposed in said recess and record producing means for producing a record on a movable recording element disposed within said recording device, means for moving said record receiving element when said magazine is disposed in said recess, said magazine when removed from said recess containing a record receiving element having record indications produced thereon, means defining a coin discharge opening in said magazine, means in said magazine for releasably retaining a coin so as normally to be inaccessible at said opening, but when actuated to cause said coin to appear at said opening, and coin release actuating means responsive to substantially complete insertion of said magazine into said recess in a position to receive said record receiving element for actuating said releasable retaining means and making said coin available at said opening.

3. A recording device including means defining a magazine receptacle, said recording device including a mailable record magazine insertable into said receptacle and means for producing record indications on a record receiving element disposed in said recording device, means for rendering said last mentioned means effective only when said magazine is disposed in said receptacle, said magazine retaining said record receiving element at least after operation of said means for producing record indications on said record receiving element whereby recorded information may be mailed with said mailable magazine, coin releasing means forming a part of said magazine, means for retaining one or more coins or tokens in said coin releasing means, and coin release actuating means in said recording device responsive to substantially complete insertion of said magazine into said receptacle for actuating said coin release means whereby a coin or token is released from said magazine.

4. A record producing device comprising means for producing record indications on a movable record receiving element, said record producing device including a magazine receptacle and a mailable record magazine insertable into said receptacle during a recording operation, means for moving said record receiving element in said magazine, coin releasing means forming a part of said recording device, means for retaining a coin in said coin releasing means, and coin release actuating means in said recording device responsive to substantially complete insertion of said magazine into said magazine receptacle for actuating said coin release means whereby said coin is released from said recording device.

ARTHUR C. NIELSEN.

REFERENCES CITED

The following references are of record in the file of this patent:

UNITED STATES PATENTS

| Number | Name | Date |
|---|---|---|
| 1,901,528 | Olsen | Mar. 14, 1933 |
| 2,430,384 | Broussard | Nov. 4, 1947 |